(12) United States Patent
Yang et al.

(10) Patent No.: US 11,211,815 B2
(45) Date of Patent: Dec. 28, 2021

(54) APPARATUS AND SYSTEM FOR BALANCING ENERGY IN BATTERY PACK

(71) Applicant: HUAWEI TECHNOLOGIES CO., LTD., Guangdong (CN)

(72) Inventors: Rui Yang, Shanghai (CN); Ming Liu, Shanghai (CN); Xiaokang Liu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 368 days.

(21) Appl. No.: 16/285,969

(22) Filed: Feb. 26, 2019

(65) Prior Publication Data
US 2019/0199117 A1    Jun. 27, 2019

Related U.S. Application Data

(63) Continuation of application No. PCT/CN2017/079601, filed on Apr. 6, 2017.

(30) Foreign Application Priority Data

Aug. 26, 2016    (CN) .......................... 201610740684.8

(51) Int. Cl.
*H02J 7/02*     (2016.01)
*H02J 50/10*    (2016.01)
(Continued)

(52) U.S. Cl.
CPC .............. *H02J 7/025* (2013.01); *B60L 58/22* (2019.02); *H01F 38/14* (2013.01);
(Continued)

(58) Field of Classification Search
CPC .. H02J 7/025; H02J 7/0013; H02J 7/00; H02J 50/40; H01F 38/14
(Continued)

(56) References Cited

U.S. PATENT DOCUMENTS 8,766,598 B2 * 7/2014 Oh .................... H02J 7/0016
320/119
9,160,185 B2 * 10/2015 Potts ...................... B60L 58/15
(Continued)

FOREIGN PATENT DOCUMENTS

CN    103199587 A    7/2013
CN    103208835 A    7/2013
(Continued)

OTHER PUBLICATIONS

International Search Report dated Jul. 10, 2017 in corresponding International Application No. PCT/CN2017/079601.
(Continued)

*Primary Examiner* — Richard V Muralidar
(74) *Attorney, Agent, or Firm* — Fish & Richardson P.C.

(57) ABSTRACT

An apparatus and a system for balancing energy in a battery pack are provided, to implement balanced energy distribution among individual batteries in a battery pack. The apparatus includes: a transmitting coil, configured to transmit an electromagnetic wave generated by an input first alternating current to multiple receiving coils; the multiple receiving coils, where parameter values of all receiving coils of the multiple receiving coils are the same, all the receiving coils are coupled to the transmitting coil at a same coupling strength, and each receiving coil is configured to receive the electromagnetic wave transmitted by the transmitting coil, and generate and output a second alternating current according to the electromagnetic wave.

10 Claims, 6 Drawing Sheets

(51) Int. Cl.
  *H02J 7/00* (2006.01)
  *H01F 38/14* (2006.01)
  *H02J 50/40* (2016.01)
  *H01M 10/44* (2006.01)
  *B60L 58/22* (2019.01)

(52) U.S. Cl.
  CPC ............ *H01M 10/441* (2013.01); *H02J 7/00* (2013.01); *H02J 7/0013* (2013.01); *H02J 7/0014* (2013.01); *H02J 7/0018* (2013.01); *H02J 7/0019* (2013.01); *H02J 50/10* (2016.02); *H02J 50/40* (2016.02)

(58) Field of Classification Search
  USPC .................................. 320/108, 112; 307/104
  See application file for complete search history.

(56) References Cited

U.S. PATENT DOCUMENTS

| | | | | |
|---|---|---|---|---|
| 10,164,441 | B2* | 12/2018 | Moussaoui | H02J 7/0018 |
| 10,361,568 | B2* | 7/2019 | Yang | B60L 58/22 |
| 10,581,254 | B2* | 3/2020 | Yang | H02M 3/33507 |
| 10,923,992 | B2* | 2/2021 | Sugiura | B62D 5/046 |
| 2012/0194137 | A1* | 8/2012 | Wang | H02J 7/0016 320/119 |
| 2013/0187605 | A1* | 7/2013 | Potts | B60L 58/22 320/112 |
| 2015/0295429 | A1* | 10/2015 | Moussaoui | H02J 7/0018 320/116 |
| 2016/0079766 | A1 | 3/2016 | Jeong et al. | |

FOREIGN PATENT DOCUMENTS

| | | |
|---|---|---|
| CN | 105226736 A | 1/2016 |
| CN | 205029407 U | 2/2016 |
| CN | 205453179 U | 8/2016 |
| DE | 102010021707 A1 | 12/2011 |
| JP | H09285027 A | 10/1997 |
| JP | 2001286072 A | 10/2001 |
| JP | 2007274837 A | 10/2007 |
| JP | 2008005573 A | 1/2008 |
| JP | 2013162709 A | 8/2013 |
| JP | 2015130792 A | 7/2015 |
| JP | 2015534422 A | 11/2015 |
| JP | 2016134965 A | 7/2016 |

OTHER PUBLICATIONS

International Search Report dated Jul. 10, 2017 in corresponding International Patent Application No. PCT/CN2017/079601 (8 pages).
Written Opinion of the International Searching Authority dated Jul. 10, 2017 in corresponding International Patent Application No. PCT/CN2017/079601 (4 pages).
Extended European Search Report issued in European Application No. 17842590.6 dated May 8, 2019, 7 pages.
Office Action issued in Japanese Application No. 2019-511346 dated Jul. 20, 2020, 10 pages (with English translation).
Office Action issued in Chinese application No. 201610740684.8, dated Jun. 20, 2019, 5 pages.

\* cited by examiner

APPARATUS AND SYSTEM FOR BALANCING ENERGY IN BATTERY PACK

CROSS-REFERENCE TO RELATED APPLICATIONS

This application is a continuation of International Application No. PCT/CN2017/079601, filed on Apr. 6, 2017, which claims priority to Chinese Patent Application 201610740684.8, filed on Aug. 26, 2016, the disclosures of the aforementioned applications are hereby incorporated by reference in their entireties.

TECHNICAL FIELD

The present invention relates to the field of electric power technologies, and in particular, to an apparatus and a system for balancing energy in a battery pack.

BACKGROUND

A rechargeable battery pack includes multiple individual batteries. An internal resistance and a capacity of an individual battery change with a usage time. As a result, terminal voltages of different individual batteries are different, causing overcharging or undercharging of the individual batteries. Overcharging of an individual battery damages the individual battery, and undercharging of an individual battery causes a waste of resources. Therefore, how to implement balanced energy distribution among the individual batteries is a problem to be resolved.

A method for implementing balanced energy distribution among the individual batteries in the battery pack may be as follows: The individual batteries transmit energy among each other in a wireless electric energy transmission manner. A switch is disposed on a circuit of each individual battery, and a control unit is configured for each individual battery to perform status information detection and connection/disconnection control on the individual battery. After receiving status information reported by each control unit, a system determines individual batteries that need to be charged or discharged. For the individual batteries that need to be charged or discharged, control units control switches on circuits of the individual batteries to be connected; and for individual batteries that do not need to be charged or discharged, control units control switches on circuits of the individual batteries to be disconnected. Balanced distribution of the energy among the individual batteries is implemented to some extent by using the foregoing method. However, in the foregoing method, a control unit and a switch need to be configured for each individual battery, and a control structure is complex. In addition, in the foregoing solution, connection and disconnection operations of multiple switches need to be triggered frequently, and connection or disconnection of each switch consumes energy. Therefore, in the foregoing solution, resource overheads are high.

In summary, the prior-art solution of implementing balanced energy distribution among the individual batteries in the battery pack has problems of a complex control structure and high resource overheads.

SUMMARY

Embodiments of the present invention provide an apparatus and a system for balancing energy in a battery pack, to implement balanced energy distribution among individual batteries in a battery pack, so as to avoid problems of a complex control structure and high resource overheads in using a prior-art solution of implementing balanced energy distribution among the individual batteries in the battery pack.

According to a first aspect, an embodiment of the present invention provides an apparatus for balancing energy in a battery pack, where the apparatus includes a transmitting coil, multiple receiving coils, and multiple rectifiers.

The transmitting coil is configured to transmit an electromagnetic wave generated by an input first alternating current to the multiple receiving coils.

Parameter values of all receiving coils of the multiple receiving coils are the same, and all the receiving coils are coupled to the transmitting coil in an electromagnetic induction manner at a same coupling strength. Each receiving coil is configured to receive the electromagnetic wave transmitted by the transmitting coil, and generate and output a second alternating current according to the electromagnetic wave.

The multiple rectifiers are connected to the multiple receiving coils in a one-to-one correspondence. Each of the multiple rectifiers is configured to convert the input second alternating current into a direct current, and output the direct current to one individual battery in a battery pack, where the multiple rectifiers and multiple individual batteries in the battery pack are in a one-to-one correspondence.

The first alternating current may be provided by a controlled alternating current source. The controlled alternating current source may be implemented in multiple manners, for example, implemented by using a full-bridge inverter and a full-bridge inversion control unit, implemented by using a half-bridge inverter and a half-bridge inversion control unit, implemented by using a single-phase three-level inverter and a single-phase three-level inversion control unit, or implemented by using a power amplifier and a power amplifier control unit.

Before the battery pack is connected to the foregoing apparatus for balancing energy in a battery pack, because the battery pack is constantly charged and discharged in a process of using the battery pack, equivalent resistances of the individual batteries are different. As a result, terminal voltages of the individual batteries are different, that is, energy is distributed in an unbalanced manner among the individual batteries. Specifically, a terminal voltage of an individual battery with a large equivalent resistance is higher, and the individual battery has more energy; and a terminal voltage of an individual battery with a small equivalent resistance is lower, and the individual battery has less energy.

After the battery pack is connected to the foregoing apparatus for balancing energy in a battery pack, the parameter values of all the receiving coils are the same, and the strengths at which the receiving coils are coupled to the transmitting coil are the same. Therefore, a value of an equivalent resistance of a parallel connection of an individual battery and a corresponding receiving coil depends only on a value of an equivalent resistance of the individual battery. When an equivalent resistance of an individual battery is relatively large, an equivalent resistance of a parallel connection of the individual battery and a corresponding receiving coil is relatively large; and an equivalent resistance, mapped to the transmitting coil, of the equivalent resistance of the parallel connection of the individual battery and the corresponding receiving coil is relatively small. Therefore, according to a voltage dividing principle in a series connection, a relatively low voltage is distributed from the transmitting coil to an equivalent resistor of the parallel connection of the individual battery and the corresponding receiving coil, so that a relatively small amount of energy is distributed to the parallel connection. When an equivalent resistance of an individual battery is relatively small, an equivalent resistance of a parallel connection of the individual battery and a corresponding receiving coil is relatively small; and an equivalent resistance, mapped to the transmitting coil, of the equivalent resistance of the parallel connection of the individual battery and the corresponding receiving coil is relatively large. Therefore, according to the voltage dividing principle in a series connection, a relatively high voltage is distributed from the transmitting coil to an equivalent resistor of the parallel connection of the individual battery and the corresponding receiving coil, so that a relatively large amount of energy is distributed to the parallel connection.

Before the battery pack is connected to the foregoing apparatus for balancing energy in a battery pack, the individual battery with a relatively large equivalent resistance has more energy, and the individual battery with a relatively small equivalent resistance has less energy. After the battery pack is connected to the apparatus for balancing energy in a battery pack, it may be implemented that less energy is distributed to the individual battery that has more energy before being connected to the apparatus, and more energy is distributed to the individual battery that has less energy before being connected to the apparatus, thereby implementing balanced energy distribution among the multiple individual batteries.

In addition, unlike the prior-art solution, in the apparatus for balancing energy in a battery pack according to this embodiment of the present invention, it is not required to dispose, according to a quantity of the individual batteries in the battery pack, multiple control units and multiple switches for control, implementing a simple control structure; and it is not required to frequently trigger connection and disconnection operations of multiple switches, featuring low resource overheads.

Furthermore, the receiving coils are coupled to the transmitting coil in the electromagnetic induction manner instead of being connected by using a conducting wire or by using a transformer, so that there is no direct physical contact between the receiving coils and the transmitting coil, implementing physical isolation. Therefore, the whole apparatus is relatively small in volume and relatively light in weight.

In a possible implementation, that all the receiving coils are coupled to the transmitting coil at a same coupling strength may be implemented in the following manner: Coil types of all the receiving coils are the same; and vertical distances from the receiving coils to the transmitting coil are the same, and among the receiving coils, distances between every two adjacent receiving coils are the same.

By using the foregoing solution, it can be implemented that all the receiving coils are coupled to the transmitting coil at the same coupling strength by setting the coil types of the receiving coils and placement location relationships between the receiving coils and the transmitting coil.

In a possible implementation, the apparatus for balancing energy in a battery pack further includes:

a first coupling capacitor connected to the transmitting coil, configured to remove a direct current component from the input first alternating current, and output, to the transmitting coil, the first alternating current from which the direct current component is removed; and multiple second coupling capacitors that are connected to the multiple rectifiers in a one-to-one correspondence and connected to the multiple receiving coils in a one-to-one correspondence, where each of the multiple second coupling capacitors is configured to remove a direct current component from the input second alternating current, and output, to one of the multiple rectifiers, the second alternating current from which the direct current component is removed.

By using the foregoing solution, the first coupling capacitor plays a function of "blocking a direct current and connecting an alternating current", so as to remove the direct current component from the first alternating current, so that the first alternating current that is input to the transmitting coil can be used, to a greater extent, to generate the electromagnetic wave. The multiple second coupling capacitors may be used to remove the direct current components from the second alternating currents, so that the second alternating currents input to the multiple rectifiers can be used, to a greater extent, to perform inversion.

In a possible implementation, the parameter value of each receiving coil of the multiple receiving coils may be a numeric value of an inductance value of the receiving coil and a resistance value of a parasitic resistor of the receiving coil.

A parameter of each receiving coil may be of multiple types, such as the inductance value of the receiving coil and the parasitic resistance of the receiving coil. When the parameter of the receiving coil is the inductance value of the receiving coil and the parasitic resistance of the receiving coil, in specific implementation, that parameter values of all receiving coils are the same may be: The numeric values of the inductance values of the receiving coils are the same, and the resistance values of the parasitic resistors of the receiving coils are the same.

In a possible implementation, a waveform of the first alternating current may be a rectangular wave or a sine wave, but is not limited to these two types of waveforms.

According to a second aspect, an embodiment of the present invention provides a system for balancing energy in a battery pack, where the system includes:

a controlled alternating current source, configured to generate and output a first alternating current;

the apparatus for balancing energy in a battery pack according to the first aspect or any possible implementation of the first aspect, separately connected to the controlled alternating current source and a battery pack, and configured to input the first alternating current that is output by the controlled alternating current source, generate multiple direct currents after processing the first alternating current, and respectively output the multiple direct currents to multiple individual batteries in the battery pack, where the multiple direct currents are in a one-to-one correspondence with the multiple individual batteries; and the battery pack, connected to the apparatus for balancing energy in a battery pack, and configured to input the multiple direct currents that are output by the apparatus for balancing energy in a battery pack.

By using the foregoing solution, the apparatus for balancing energy in a battery pack may be used to implement balanced energy distribution among the multiple individual batteries in the battery pack.

In the foregoing system, a power source used by the controlled alternating current source to generate the first alternating current may be provided in the following two manners:

In one manner, the battery pack in the foregoing system provides a power source to the controlled alternating current source. In this case, at least one individual battery in the battery pack is connected to the controlled alternating current source, and the at least one individual battery provides a power source to the controlled alternating current source. The power source is used by the controlled alternating current source to generate the first alternating current.

By using the foregoing solution, balanced energy distribution among the multiple individual batteries included in the battery pack may be implemented when no other external power source is connected.

In the other manner, in a possible implementation, the system further includes:

another battery pack other than the battery pack, connected to the controlled alternating current source, and configured to provide a power source to the controlled alternating current source, where the power source is used by the controlled alternating current source to generate the first alternating current.

By using the foregoing solution, balanced energy distribution among the multiple individual batteries included in the battery pack may be implemented while the multiple individual batteries included in the battery pack are charged.

DESCRIPTION OF EMBODIMENTS

To help better understand the foregoing objectives, solutions, and advantages of the embodiments of the present invention, the following provides detailed descriptions. The detailed descriptions elaborate various implementations of an apparatus and/or a method by using accompanying drawings, such as block diagrams and flowcharts, and/or examples. These block diagrams, flowcharts, and/or examples include one or more functions and/or operations. Persons skilled in the art may understand that the functions and/or operations in these block diagrams, flowcharts, or examples may be independently or jointly implemented by using various types of hardware, software, or firmware or implemented by using any combination of hardware, software, and firmware.

The technical solutions provided in the embodiments of the present invention relate to balancing energy among multiple individual batteries in a battery pack. The battery pack generally includes multiple individual batteries. For a battery pack formed by connecting multiple individual batteries in series, the battery pack is constantly charged and discharged in a process of using the battery pack, causing internal resistances and capacities of the individual batteries to be different. As a result, terminal voltages of the individual batteries are different. An individual battery with a high terminal voltage may be overcharged, damaging the individual battery; an individual battery with a low terminal voltage may be undercharged, resulting in a waste of energy output by another individual battery. Therefore, how to balance distribution of energy among the multiple individual batteries included in the battery pack is a problem that needs to be resolved urgently.

Embodiments of the present invention provide an apparatus and a system for balancing energy in a battery pack, to implement balanced energy distribution among individual batteries in a battery pack, so as to avoid problems of a complex control structure and high resource overheads in using a prior-art solution of implementing balanced energy distribution among the individual batteries in the battery pack.

The following describes in detail the apparatus and the system for balancing energy in a battery pack with reference to the accompanying drawings.

Figure 1:
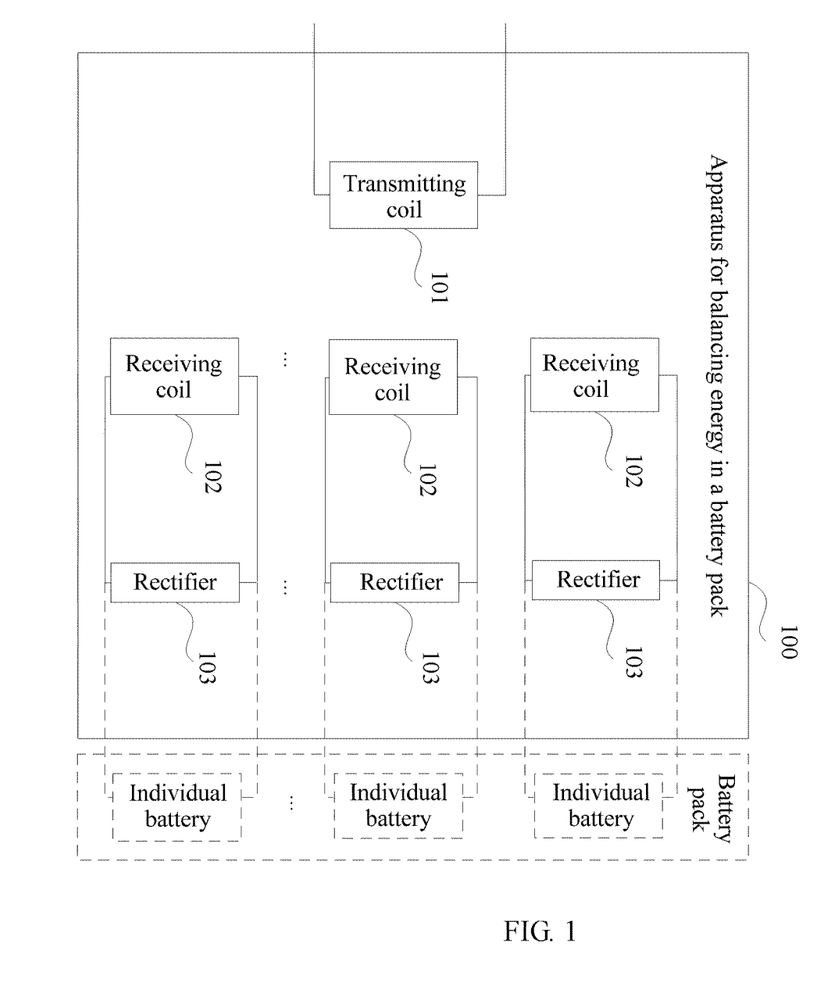
FIG. 1 is a schematic structural diagram of an apparatus for balancing energy in a battery pack according to an embodiment of the present invention.

An embodiment of the present invention provides an apparatus for balancing energy in a battery pack. As shown in FIG. 1, the apparatus 100 for balancing energy in a battery pack (hereinafter referred to as the apparatus 100 for short) includes:

a transmitting coil 101, configured to input a first alternating current, and transmit an electromagnetic wave generated by the first alternating current to multiple receiving coils 102;

the multiple receiving coils 102, where parameter values of all receiving coils 102 of the multiple receiving coils 102 are the same, all the receiving coils 102 are coupled to the transmitting coil 101 in an electromagnetic induction manner at a same coupling strength, and each receiving coil 102 is configured to receive the electromagnetic wave transmitted by the transmitting coil 101, and generate and output a second alternating current according to the electromagnetic wave; and multiple rectifiers 103, where the multiple rectifiers 103 are connected to the multiple receiving coils 102 in a one-to-one correspondence, and each rectifier 103 of the multiple rectifiers 103 is configured to convert the input second alternating current into a direct current, and output the direct current to one individual battery in a battery pack, where the multiple rectifiers 103 and multiple individual batteries in the battery pack are in a one-to-one correspondence.

In this embodiment of the present invention, a waveform of the first alternating current is not limited. For example, the waveform of the first alternating current may be a rectangular wave or a sine wave, or may be any waveform.

The first alternating current input to the apparatus 100 may be from a controlled alternating current source. The controlled alternating current source may be implemented in multiple manners, for example, implemented by using a full-bridge inverter and a full-bridge inversion control unit, implemented by using a half-bridge inverter and a half-bridge inversion control unit, implemented by using a single-phase three-level inverter and a single-phase three-level inversion control unit, or implemented by using a power amplifier and a power amplifier control unit.

When the first alternating current is from the controlled alternating current source, the controlled alternating current source needs to perform inversion on a direct current provided by a power source, to generate the first alternating current. The power source that provides the direct current may be all or some individual batteries in the battery pack charged by the apparatus 100, or may be another individual battery or battery pack other than the charged battery pack. When the power source that provides the direct current is all or some individual batteries in the battery pack charged by the apparatus 100, the battery pack for which the apparatus 100 provided in this embodiment of the present invention is configured may implement balanced energy distribution among the multiple individual batteries included in the battery pack when no other external power source is connected. When the power source that provides the direct current is the another individual battery or battery pack other than the charged battery pack, in addition to implementing balanced energy distribution in the battery pack, the apparatus 100 provided in this embodiment of the present invention may charge the battery pack.

There may be one or more controlled alternating current sources. When there are multiple controlled alternating current sources, the multiple controlled alternating current sources may be connected in parallel, and jointly generate the first alternating current. A current value of the first alternating current is a sum of current values of currents generated by the multiple controlled alternating current sources. The multiple controlled alternating current sources may be jointly connected to one apparatus for balancing energy in a battery pack provided in this embodiment, or each alternating current source of the multiple controlled alternating current sources is connected to one apparatus for balancing energy in a battery pack provided in this embodiment, or some alternating current sources of the multiple controlled alternating current sources are connected to one apparatus for balancing energy in a battery pack provided in this embodiment, to implement balanced energy distribution among individual batteries in the battery pack.

This embodiment does not limit a type, a quantity, and an implementation of a component that provides the first alternating current.

In this embodiment of the present invention, an apparatus for detecting energy of each individual battery in the battery pack may be disposed to detect the energy of the individual battery. When a result of the detection indicates that the energy of the individual batteries is unbalanced, the apparatus 100 provided in this embodiment of the present invention may be started. In specific implementation, a switch may be disposed on a conducting wire connected to the transmitting coil in the apparatus 100. When the detection indicates that the energy of the individual batteries is unbalanced, the switch is connected, to start the apparatus 100; or when the detection indicates that the energy of the individual batteries is balanced, the switch is disconnected, to shut down the apparatus 100.

It also needs to be noted that, in specific implementation, the apparatus 100 provided in this embodiment of the present invention may be an apparatus packaged together with the charged battery pack, or may be an apparatus packaged independently.

Before the battery pack is connected to the apparatus 100, because the battery pack is constantly charged and discharged in a process of using the battery pack, equivalent resistances of the individual batteries are different. As a result, terminal voltages of the individual batteries are different, that is, energy is distributed in an unbalanced manner among the individual batteries. Specifically, a terminal voltage of an individual battery with a large equivalent resistance is higher, and the individual battery has more energy; and a terminal voltage of an individual battery with a small equivalent resistance is lower, and the individual battery has less energy.

After the battery pack is connected to the apparatus 100, the parameter values of all the receiving coils 102 are the same, and the strengths at which the receiving coils 102 are coupled to the transmitting coil 101 are the same. Therefore, a value of an equivalent resistance of a parallel connection of an individual battery and a corresponding receiving coil 102 depends only on a value of an equivalent resistance of the individual battery. When an equivalent resistance of an individual battery is relatively large, an equivalent resistance of a parallel connection of the individual battery and a corresponding receiving coil 102 is relatively large; and an equivalent resistance, mapped to the transmitting coil 101, of the equivalent resistance of the parallel connection of the individual battery and the corresponding receiving coil 102 is relatively small. Therefore, according to a voltage dividing principle in a series connection, a relatively low voltage is distributed from the transmitting coil 101 to an equivalent resistor of the parallel connection of the individual battery and the corresponding receiving coil 102, so that a relatively small amount of energy is distributed to the parallel connection. When an equivalent resistance of an individual battery is relatively small, an equivalent resistance of a parallel connection of the individual battery and a corresponding receiving coil 102 is relatively small; and an equivalent resistance, mapped to the transmitting coil 101, of the equivalent resistance of the parallel connection of the individual battery and the corresponding receiving coil 102 is relatively large. Therefore, according to the voltage dividing principle in a series connection, a relatively high voltage is distributed from the transmitting coil 101 to an equivalent resistor of the parallel connection of the individual battery and the corresponding receiving coil 102, so that a relatively large amount of energy is distributed to the parallel connection.

Before the battery pack is connected to the apparatus 100, the individual battery with a relatively large equivalent resistance has more energy, and the individual battery with a relatively small equivalent resistance has less energy. After the battery pack is connected to the apparatus 100, it may be implemented that less energy is distributed to the individual battery that has more energy before being connected to the apparatus 100, and more energy is distributed to the individual battery that has less energy before being connected to the apparatus 100, thereby implementing balanced energy distribution among the multiple individual batteries.

In addition, unlike the prior-art solution, in the apparatus 100 according to this embodiment of the present invention, it is not required to dispose, according to a quantity of the individual batteries in the battery pack, multiple control units and multiple switches for control, implementing a simple control structure; and it is not required to frequently trigger connection and disconnection operations of multiple switches, featuring low resource overheads. Furthermore, the receiving coils 102 are coupled to the transmitting coil 101 in the electromagnetic induction manner instead of being connected by using a conducting wire or by using a transformer, so that there is no direct physical contact between the receiving coils 102 and the transmitting coil 101, implementing physical isolation. Therefore, the apparatus 100 is relatively small in volume and relatively light in weight.

When the first alternating current input to the apparatus 100 is provided by the controlled alternating current source, because an output voltage of the controlled alternating current source is adjustable, when current values of the second alternating currents output by the apparatus 100 are extremely small, an energy balancing capability of the multiple individual batteries deteriorates. In this case, the output voltage of the controlled alternating current source may be increased, to increase the current values of the second alternating currents, thereby improving the energy balancing capability of the multiple individual batteries. When charging efficiency of the apparatus 100 is extremely low, the output voltage of the controlled alternating current source may be reduced, to improve the charging efficiency of the apparatus 100.

Optionally, that all the receiving coils 102 are coupled to the transmitting coil 101 at a same coupling strength may be implemented in the following manner: Coil types of all the receiving coils 102 are the same; and vertical distances from the receiving coils 102 to the transmitting coil 101 are the same, and among the receiving coils 102, distances between every two adjacent receiving coils 102 are the same.

The coil type may be a shape of the coils, for example, circular coils or square coils. It can be implemented that all the receiving coils 102 are coupled to the transmitting coil 101 at the same coupling strength by restricting the coil types of the receiving coils 102 and placement locations of the receiving coils 102 and the transmitting coil 101.

Figure 2:
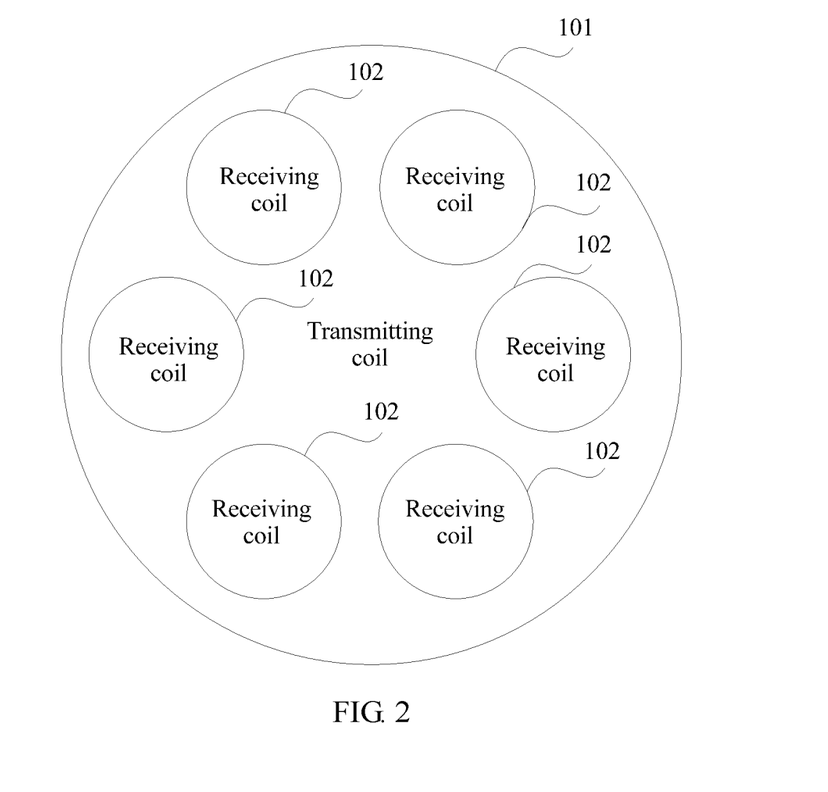
FIG. 2 is a schematic diagram of a possible location relationship between a transmitting coil and receiving coils in an apparatus for balancing energy in a battery pack according to an embodiment of the present invention.

For example, when there are six receiving coils 102, and the coil types of the six receiving coils 102 and the transmitting coil 101 are all circular coils, a possible placement location relationship between the transmitting coil 101 and the receiving coils 102 may be shown in FIG. 2. The placement location relationship meets the following: The receiving coils 102 are evenly distributed in the transmitting coil, and vertical distances from the receiving coils 102 to the transmitting coil 101 are the same (a vertical distance relationship, in space, between the receiving coils 102 and the transmitting coil 101 is not shown in FIG. 2). When the transmitting coil 101 and the six receiving coils 102 are placed according to the placement location relationship shown in FIG. 2, and parameter values of the six receiving coils 102 are the same, it can be implemented that strengths at which the six receiving coils 102 are coupled to the transmitting coil 101 are the same.

Figure 3:
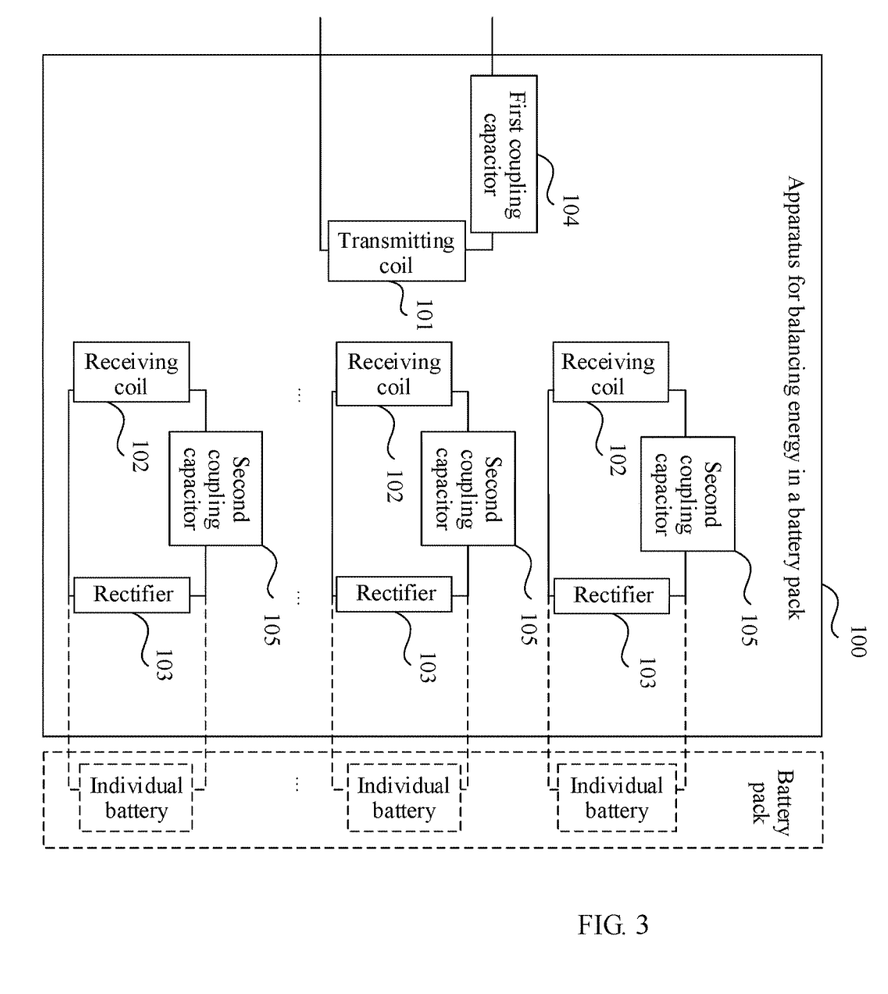
FIG. 3 is a schematic structural diagram of another apparatus for balancing energy in a battery pack according to an embodiment of the present invention.

Optionally, the apparatus 100 may further include a first coupling capacitor and multiple second coupling capacitors.

The first coupling capacitor is connected to the transmitting coil 101, and is configured to remove a direct current component from the input first alternating current, and output, to the transmitting coil 101, the first alternating current from which the direct current component is removed.

The multiple second coupling capacitors are connected to the multiple rectifiers 103 in a one-to-one correspondence and connected to the multiple receiving coils 102 in a one-to-one correspondence; and each of the multiple second coupling capacitors is configured to remove a direct current component from the input second alternating current, and output, to one rectifier 103 of the multiple rectifiers 103, the second alternating current from which the direct current component is removed.

When the apparatus 100 includes the first coupling capacitor and the multiple second coupling capacitors, the apparatus 100 may be that shown in FIG. 3. In FIG. 3, a first coupling capacitor 104 and multiple second coupling capacitors 105 are disposed in the apparatus 100. The first coupling capacitor 104 may play a function of "blocking a direct current and connecting an alternating current", so as to remove the direct current component from the first alternating current, so that the first alternating current that is input to the transmitting coil 101 can be used, to a greater extent, to generate the electromagnetic wave. Similarly, the multiple second coupling capacitors 105 may be used to remove the direct current components from the second alternating currents, so that the second alternating currents input to the multiple rectifiers 103 can be used, to a greater extent, to perform inversion.

Optionally, that parameter values of all receiving coils 102 of the multiple receiving coils 102 are the same is specifically: Numeric values of inductance values of the receiving coils 102 are the same, and resistance values of parasitic resistors of the receiving coils 102 are the same.

The following uses a specific circuit as an example to describe how the apparatus for balancing energy in a battery pack provided in this embodiment of the present invention balances energy among the multiple individual batteries included in the battery pack.

It is described above that the first alternating current input to the apparatus 100 may be from the controlled alternating current source. The controlled alternating current source generates the first alternating current after performing inversion on the direct current provided by the power source. After processing the input first alternating current, the apparatus 100 outputs the first alternating current to the multiple individual batteries included in the battery pack to charge the multiple individual batteries.

Figure 4:
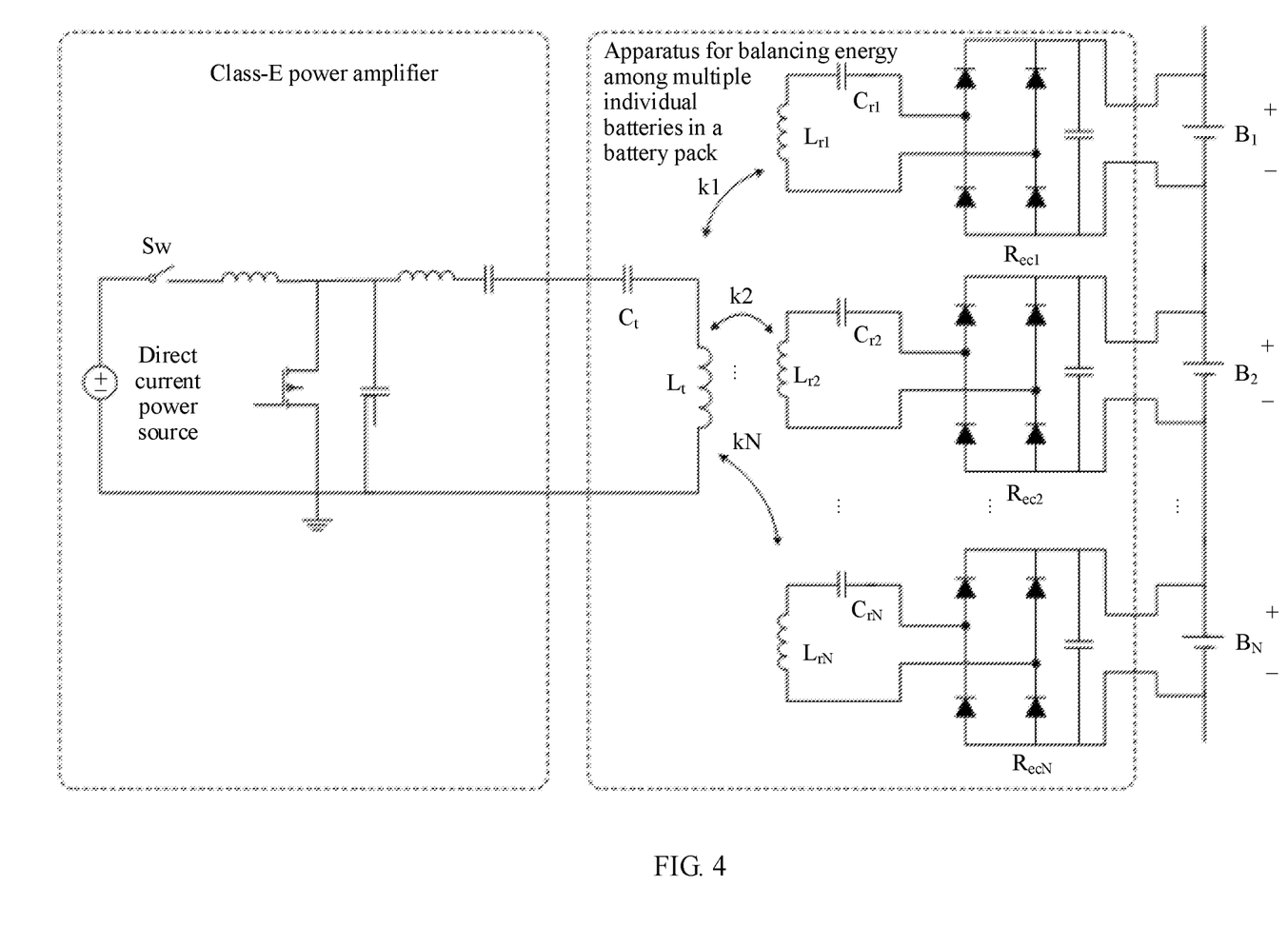
FIG. 4 is a schematic structural diagram of an apparatus that includes a controlled alternating current source, a power source of the controlled alternating current source, an apparatus for balancing energy in a battery pack, and a battery pack according to an embodiment of the present invention.

FIG. 4 shows an apparatus that includes a controlled alternating current source, a power source of the controlled alternating current source, an apparatus for balancing energy in a battery pack, and a battery pack. In FIG. 4, a class-E power amplifier may be considered as a specific implementation of the controlled alternating current source and the power source of the controlled alternating current source, and is configured to generate a first alternating current and input the generated first alternating current to the apparatus for balancing energy in a battery pack. The apparatus for balancing energy in a battery pack obtains direct currents after processing the first alternating current, and output the direct currents to N individual batteries ($B_1, B_2, \ldots,$ and $B_N$) included in the battery pack, to charge the N individual batteries. The apparatus for balancing energy in a battery pack in FIG. 4 may be the apparatus 100 for balancing energy in a battery pack provided in the embodiment of the present invention.

In the class-E power amplifier shown in FIG. 4, $S_w$ is a control switch of the entire apparatus. When energy balancing does not need to be performed on the N individual batteries ($B_1, B_2, \ldots,$ and $B_N$), the control switch $S_w$ is disconnected. When energy balancing needs to be performed on the N individual batteries ($B_1, B_2, \ldots,$ and $B_N$), the control switch $S_w$ is connected. In this way, a direct current generated by a direct current power source is converted into the first alternating current after being inverted, and the first alternating current is output to the apparatus for balancing energy in a battery pack, to perform energy balancing on the N individual batteries ($B_1, B_2, \ldots,$ and $B_N$).

In the apparatus for balancing energy in a battery pack shown in FIG. 4, $L_t$ is a transmitting coil; $L_{r1}, L_{r2}, \ldots,$ and $L_{rN}$ are N receiving coils; $R_{ec1}, R_{ec2}, \ldots,$ and $R_{ecN}$ are N rectifiers; $B_1, B_2, \ldots,$ and $B_N$ are N individual batteries included in the battery pack; $C_t$ is a first coupling capacitor; $C_{r1}, C_{r2}, \ldots,$ and $C_{rN}$ are N second coupling capacitors; and k1, k2, and kN respectively represent strengths at which the N receiving coils $L_{r1}, L_{r2}, \ldots,$ and $L_{rN}$ are coupled to the transmitting coil $L_t$. The transmitting coil $L_t$ transmits an electromagnetic wave generated by the input first alternating current to the N receiving coils $L_{r1}, L_{r2}, \ldots,$ and $L_{rN}$. When parameter values of the N receiving coils $L_{r1}, L_{r2}, \ldots,$ and $L_{rN}$ are the same, and the strengths at which the N receiving coils $L_{r1}, L_{r2}, \ldots,$ and $L_{rN}$ are coupled to the transmitting coil $L_t$ are the same, the N receiving coils $L_{r1}, L_{r2}, \ldots,$ and $L_{rN}$ receive the electromagnetic wave transmitted by the transmitting coil $L_t$, generate second alternating currents according to the received electromagnetic wave, and output the second alternating currents to the N rectifiers $R_{ec1}$, $R_{ec2}, \ldots,$ and $R_{ecN}$. The N rectifiers $R_{ec1}, R_{ec2}, \ldots,$ and $R_{ecN}$ respectively convert the second alternating currents into direct currents, and then output the direct currents to respectively charge the N individual batteries $B_1, B_2, \ldots,$ and $B_N$. In a process of charging the N individual batteries $B_1, B_2, \ldots,$ and $B_N$, energy balancing may be implemented among the N individual batteries $B_1, B_2, \ldots,$ and $B_N$.

Figure 5:
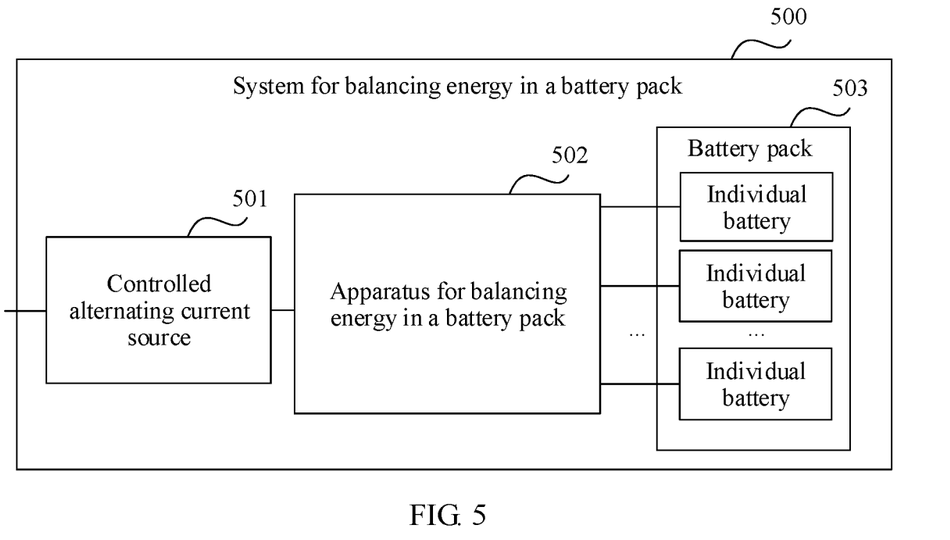
FIG. 5 is a schematic structural diagram of a first system for balancing energy in a battery pack according to an embodiment of the present invention.

An embodiment of the present invention further provides a system for balancing energy in a battery pack. As shown in FIG. 5, the system 500 for balancing energy in a battery pack includes:

a controlled alternating current source 501, configured to generate and output a first alternating current;

an apparatus 502 for balancing energy in a battery pack, separately connected to the controlled alternating current source 501 and a battery pack 503, and configured to input the first alternating current that is output by the controlled alternating current source 501, generate multiple direct currents after processing the first alternating current, and respectively output the multiple direct currents to multiple individual batteries in the battery pack 503, where the multiple direct currents are in a one-to-one correspondence with the multiple individual batteries; and the battery pack 503, connected to the apparatus 502 for balancing energy in a battery pack, and configured to input the multiple direct currents that are output by the apparatus 502 for balancing energy in a battery pack.

For details about a function and a specific implementation of the controlled alternating current source 501, refer to related description of the apparatus 100 for balancing energy in a battery pack shown in FIG. 1. The apparatus 502 for balancing energy in a battery pack may be the apparatus 100 for balancing energy in a battery pack shown in FIG. 1 or FIG. 3. The battery pack 503 may be the battery pack connected to the apparatus 100 for balancing energy in a battery pack shown in FIG. 1 or FIG. 3. Details are not described herein again.

The system 500 for balancing energy in a battery pack shown in FIG. 5 may implement balanced energy distribution among the multiple individual batteries in the battery pack 503 by using the apparatus 502 for balancing energy in a battery pack.

Optionally, at least one individual battery in the battery pack 503 is connected to the controlled alternating current source 501, the at least one individual battery provides a power source to the controlled alternating current source 501, and the power source is used by the controlled alternating current source 501 to generate the first alternating current.

Figure 6:
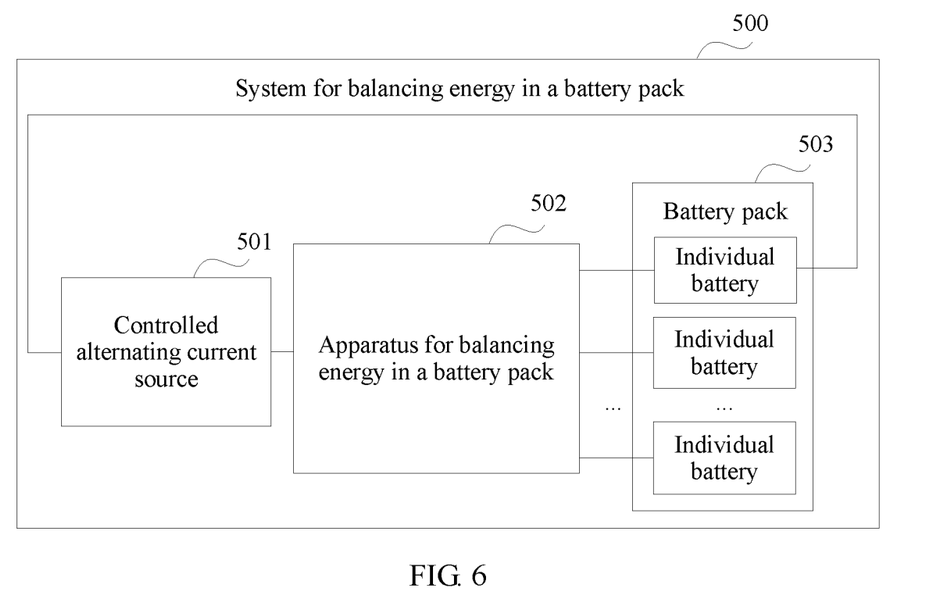
FIG. 6 is a schematic structural diagram of a second system for balancing energy in a battery pack according to an embodiment of the present invention.

When the at least one individual battery in the battery pack 503 provides a power source to the controlled alternating current source 501, the system 500 for balancing energy in a battery pack shown in FIG. 5 may be that shown in FIG. 6. FIG. 6 uses an example in which a first individual battery in the battery pack 503 provides a power source to the controlled alternating current source 501. In actual implementation, any one or more individual batteries in the battery pack 503 may be used to provide a power source to the controlled alternating current source 501.

When the at least one individual battery in the battery pack 503 provides a power source to the controlled alternating current source 501, the system 500 for balancing energy in a battery pack shown in FIG. 5 may implement balanced energy distribution among the multiple individual batteries included in the battery pack 503 when no other external power source is connected.

Optionally, the system further includes another battery pack other than the battery pack 503, connected to the controlled alternating current source 501, and configured to provide a power source to the controlled alternating current source 501, where the power source is used by the controlled alternating current source 501 to generate the first alternating current.

Figure 7:
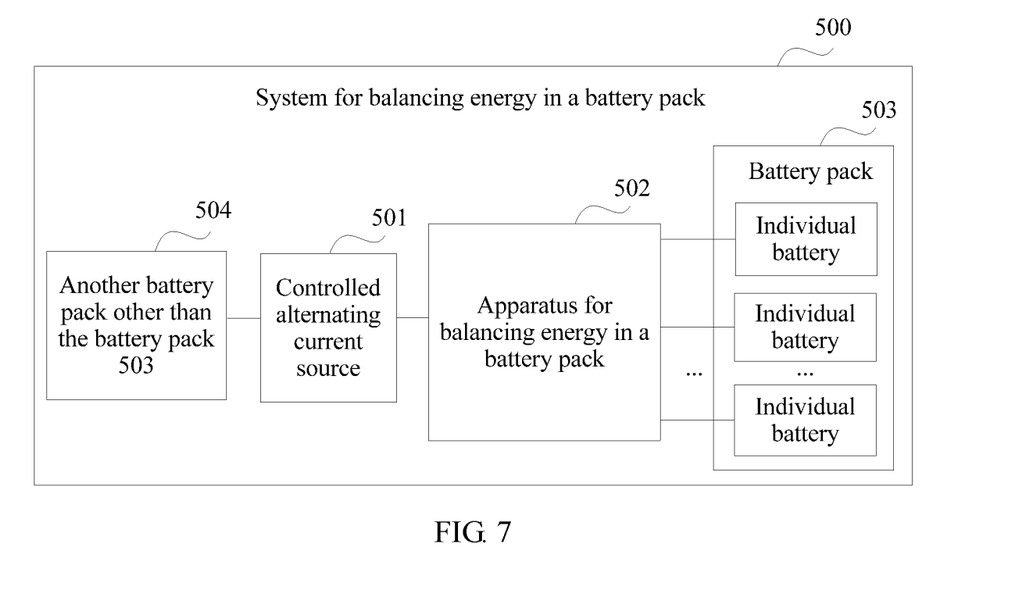
FIG. 7 is a schematic structural diagram of a third system for balancing energy in a battery pack according to an embodiment of the present invention.

When the another battery pack other than the battery pack 503 provides a power source to the controlled alternating current source 501, the system 500 for balancing energy in a battery pack shown in FIG. 5 may be that shown in FIG. 7. In FIG. 7, the another battery pack other than the battery pack 503 may charge the multiple individual batteries in the battery pack 503.

When the another battery pack other than the battery pack 503 provides a power source to the controlled alternating current source 501, the system 500 for balancing energy in a battery pack shown in FIG. 5 may implement balanced energy distribution among the multiple individual batteries included in the battery pack 503 as well as charging the multiple individual batteries in the battery pack 503.

Before the battery pack is connected to the apparatus for balancing energy in a battery pack provided in this embodiment of the present invention, because the battery pack is constantly charged and discharged in a process of using the battery pack, equivalent resistances of the individual batteries are different. As a result, terminal voltages of the individual batteries are different, that is, energy is distributed in an unbalanced manner among the individual batteries. Specifically, a terminal voltage of an individual battery with a large equivalent resistance is higher, and the individual battery has more energy; and a terminal voltage of an individual battery with a small equivalent resistance is lower, and the individual battery has less energy.

After the battery pack is connected to the apparatus for balancing energy in a battery pack provided in this embodiment of the present invention, the parameter values of all the receiving coils are the same, and the strengths at which the receiving coils are coupled to the transmitting coil are the same. Therefore, a value of an equivalent resistance of a parallel connection of an individual battery and a corresponding receiving coil depends only on a value of an equivalent resistance of the individual battery. When an equivalent resistance of an individual battery is relatively large, an equivalent resistance of a parallel connection of the individual battery and a corresponding receiving coil is relatively large; and an equivalent resistance, mapped to the transmitting coil, of the equivalent resistance of the parallel connection of the individual battery and the corresponding receiving coil is relatively small. Therefore, according to a voltage dividing principle in a series connection, a relatively low voltage is distributed from the transmitting coil to an equivalent resistor of the parallel connection of the individual battery and the corresponding receiving coil, so that a relatively small amount of energy is distributed to the parallel connection. When an equivalent resistance of an individual battery is relatively small, an equivalent resistance of a parallel connection of the individual battery and a corresponding receiving coil is relatively small; and an equivalent resistance, mapped to the transmitting coil, of the equivalent resistance of the parallel connection of the individual battery and the corresponding receiving coil is relatively large. Therefore, according to the voltage dividing principle in a series connection, a relatively high voltage is distributed from the transmitting coil to an equivalent resistor of the parallel connection of the individual battery and the corresponding receiving coil, so that a relatively large amount of energy is distributed to the parallel connection.

Before the battery pack is connected to the apparatus for balancing energy in a battery pack provided in this embodiment of the present invention, the individual battery with a relatively large equivalent resistance has more energy, and the individual battery with a relatively small equivalent resistance has less energy. After the battery pack is connected to the apparatus for balancing energy in a battery pack, it may be implemented that less energy is distributed to the individual battery that has more energy before being connected to the apparatus, and more energy is distributed to the individual battery that has less energy before being connected to the apparatus, thereby implementing balanced energy distribution among the multiple individual batteries.

In addition, unlike the prior-art solution, in the apparatus and the system for balancing energy in a battery pack according to the embodiments of the present invention, it is not required to dispose, according to a quantity of the individual batteries in the battery pack, multiple control units and multiple switches for control, implementing a simple control structure; and it is not required to frequently trigger connection and disconnection operations of multiple switches, featuring low resource overheads.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. An apparatus for balancing energy in a battery pack, comprising:
   a transmitting coil configured to:
      input a first alternating current; and
      transmit an electromagnetic wave generated by the first alternating current to multiple receiving coils;
   the multiple receiving coils, wherein parameter values of all receiving coils of the multiple receiving coils are the same, all the receiving coils are coupled to the transmitting coil in an electromagnetic induction manner at a same coupling strength, and each receiving coil is configured to:
      receive the electromagnetic wave transmitted by the transmitting coil; and
      generate and output a second alternating current according to the electromagnetic wave, wherein:
         coil types of all the receiving coils are the same;
         vertical distances from the receiving coils to the transmitting coil are the same; and
         among the receiving coils, distances between every two adjacent receiving coils are the same; and
   multiple rectifiers, wherein the multiple rectifiers are connected to the multiple receiving coils in a one-to-one correspondence, and each of the multiple rectifiers is configured to:
      convert the second alternating current into a direct current; and
      output the direct current to one individual battery in a battery pack, wherein the multiple rectifiers and multiple individual batteries in the battery pack are in a one-to-one correspondence.

2. The apparatus according to claim 1, further comprising:
   a first coupling capacitor, connected to the transmitting coil, and configured to:
      remove a direct current component from the input first alternating current; and
      output, to the transmitting coil, the first alternating current from which the direct current component is removed; and multiple second coupling capacitors, connected to the multiple rectifiers in a one-to-one correspondence and connected to the multiple receiving coils in a one-to-one correspondence, wherein each of the multiple second coupling capacitors is configured to:
  remove a direct current component from the second alternating current; and
  output, to one of the multiple rectifiers, the second alternating current from which the direct current component is removed.

3. The apparatus according to claim 1, wherein that parameter values of all receiving coils of the multiple receiving coils are the same comprises:
  numeric values of inductance values of the receiving coils are the same, and
  resistance values of parasitic resistors of the receiving coils are the same.

4. The apparatus according to claim 1, wherein a waveform of the first alternating current is a rectangular wave or a sine wave.

5. A system for balancing energy in a battery pack, comprising:
  a controlled alternating current source configured to generate and output a first alternating current;
  an apparatus for balancing energy in the battery pack, separately connected to the controlled alternating current source and the battery pack, and configured to:
    input the first alternating current that is output by the controlled alternating current source;
    generate multiple direct currents after processing the first alternating current; and
    respectively output the multiple direct currents to multiple individual batteries in the battery pack, wherein the multiple direct currents are in a one-to-one correspondence with the multiple individual batteries; and
  the battery pack, connected to the apparatus, and configured to input the multiple direct currents that are output by the apparatus for balancing energy in the battery pack;
  wherein the apparatus comprises:
    a transmitting coil, configured to:
      input a first alternating current; and
      transmit an electromagnetic wave generated by the first alternating current to multiple receiving coils;
    the multiple receiving coils, wherein parameter values of all receiving coils of the multiple receiving coils are the same, all the receiving coils are coupled to the transmitting coil in an electromagnetic induction manner at a same coupling strength, and each receiving coil is configured to:
      receive the electromagnetic wave transmitted by the transmitting coil; and
      generate and output a second alternating current according to the electromagnetic wave, wherein:
        coil types of all the receiving coils are the same;
        vertical distances from the receiving coils to the transmitting coil are the same; and
        among the receiving coils, distances between every two adjacent receiving coils are the same; and
    multiple rectifiers, wherein the multiple rectifiers are connected to the multiple receiving coils in a one-to-one correspondence, and each of the multiple rectifiers is configured to:
      convert the second alternating current into a direct current; and
      output the direct current to one individual battery in a battery pack, wherein the multiple rectifiers and multiple individual batteries in the battery pack are in a one-to-one correspondence.

6. The system according to claim 5, wherein:
  at least one individual battery in the battery pack is connected to the controlled alternating current source;
  the at least one individual battery provides a power source to the controlled alternating current source; and
  the power source is used by the controlled alternating current source to generate the first alternating current.

7. The system according to claim 5, further comprising:
  another battery pack other than the battery pack, the another battery pack connected to the controlled alternating current source and configured to provide a power source to the controlled alternating current source, wherein the power source is used by the controlled alternating current source to generate the first alternating current.

8. The system according to claim 5, the apparatus further comprises:
  a first coupling capacitor connected to the transmitting coil, the first coupling capacitor configured to:
    remove a direct current component from the input first alternating current; and
    output, to the transmitting coil, the first alternating current from which the direct current component is removed; and
  multiple second coupling capacitors connected to the multiple rectifiers in a one-to-one correspondence and connected to the multiple receiving coils in a one-to-one correspondence, wherein each of the multiple second coupling capacitors is configured to:
    remove a direct current component from the second alternating current; and
    output, to one of the multiple rectifiers, the second alternating current from which the direct current component is removed.

9. The system according to claim 5, wherein that parameter values of all receiving coils of the multiple receiving coils are the same comprises:
  numeric values of inductance values of the receiving coils are the same, and
  resistance values of parasitic resistors of the receiving coils are the same.

10. The system according to claim 5, wherein a waveform of the first alternating current is a rectangular wave or a sine wave.

* * * * *